(12) United States Patent
Hikitani et al.

(10) Patent No.: US 11,365,671 B2
(45) Date of Patent: Jun. 21, 2022

(54) COOLING DEVICE FOR VEHICLE

(71) Applicant: Mazda Motor Corporation, Hiroshima (JP)

(72) Inventors: Shinichi Hikitani, Aki-gun (JP); Naoki Nagano, Aki-gun (JP); Yoshiyuki Yamashita, Aki-gun (JP); Yukio Jo, Aki-gun (JP); Yuma Yamaga, Aki-gun (JP); Sakumi Haseto, Aki-gun (JP); Shunsuke Fukuda, Aki-gun (JP); Tatsuhiko Iwasaki, Aki-gun (JP); Michiyuki Miura, Aki-gun (JP); Aoi Oizumi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/171,171

(22) Filed: Feb. 9, 2021

(65) Prior Publication Data

US 2021/0301712 A1 Sep. 30, 2021

(30) Foreign Application Priority Data

Mar. 25, 2020 (JP) .............................. JP2020-054593

(51) Int. Cl.
*F01P 11/08* (2006.01)
*F01P 3/20* (2006.01)
(Continued)

(52) U.S. Cl.
CPC .................. *F01P 3/20* (2013.01); *F01P 7/14* (2013.01); *F16H 57/0413* (2013.01);
(Continued)

(58) Field of Classification Search
CPC combination set(s) only.
See application file for complete search history.

(56) References Cited

U.S. PATENT DOCUMENTS

| 7,261,068 B1* | 8/2007 | Wantschik | .............. F01P 7/165 |
| | | | 123/41.29 |
| 2006/0060346 A1* | 3/2006 | Sasaki | ................. F16H 57/0415 |
| | | | 165/202 |

(Continued)

FOREIGN PATENT DOCUMENTS

| JP | 2015001301 A | * | 1/2015 |
| JP | 2015001301 A | | 1/2015 |

OTHER PUBLICATIONS

European Patent Office, Extended European Search Report Issued in Application No. 21157266.4, dated Jun. 16, 2021, Germany, 7 pages.

*Primary Examiner* — George C Jin
*Assistant Examiner* — Teuta B Holbrook
(74) *Attorney, Agent, or Firm* — Alleman Hall Creasman & Tuttle LLP

(57) ABSTRACT

A cooling device for a vehicle is provided, which includes a first coolant channel through which a first coolant for cooling an engine flows, a second coolant channel through which a second coolant for cooling a motor drive flows, and an oil channel through which oil for lubricating inside a transmission flows. The oil channel includes a first heat exchanger configured to exchange heat between the first coolant and the oil, a second heat exchanger configured to exchange heat between the second coolant and the oil, and a valve configured to adjust a first flow rate of the oil circulating through the first heat exchanger and a second flow rate of the oil circulating through the second heat exchanger.

15 Claims, 6 Drawing Sheets

(51) Int. Cl.
     *F01P 7/14*           (2006.01)
     *F16H 57/04*         (2010.01)
     *F28F 27/02*         (2006.01)
     *H02K 9/19*          (2006.01)
     *F01P 5/10*          (2006.01)
     *F01P 3/00*          (2006.01)

(52) U.S. Cl.
     CPC ......... *F16H 57/0415* (2013.01); *F28F 27/02* (2013.01); *H02K 9/19* (2013.01); *F01P 5/10* (2013.01); *F01P 2003/006* (2013.01); *F01P 2003/008* (2013.01); *F01P 2007/146* (2013.01); *F01P 2060/045* (2013.01)

(56) References Cited

U.S. PATENT DOCUMENTS

| | | | |
|---|---|---|---|
| 2009/0272441 A1* | 11/2009 | Sasaki | F01P 11/02 137/468 |
| 2012/0143437 A1 | 6/2012 | Spohn et al. | |
| 2015/0176696 A1* | 6/2015 | Hidaka | F28D 1/04 184/6.1 |
| 2016/0138878 A1* | 5/2016 | Gopal | F01P 7/165 165/103 |
| 2017/0314454 A1* | 11/2017 | Sakamoto | F01P 3/02 |
| 2018/0030867 A1* | 2/2018 | Honda | F01M 1/02 |
| 2018/0347454 A1* | 12/2018 | Wiegemann | F02B 37/00 |
| 2019/0120118 A1* | 4/2019 | Son | F01P 3/18 |
| 2019/0145304 A1* | 5/2019 | Giraudo | F01P 5/12 123/41.08 |
| 2020/0263783 A1* | 8/2020 | Gonze | F16H 57/0475 |
| 2020/0353790 A1* | 11/2020 | Miyoshi | B60H 1/00885 |

* cited by examiner

COOLING DEVICE FOR VEHICLE

TECHNICAL FIELD

The present disclosure relates to a cooling device for a vehicle, and particularly to a cooling device provided with a coolant channel of an engine, a coolant channel of a motor drive, and an oil channel for oil which lubricates inside a transmission.

BACKGROUND OF THE DISCLOSURE

Conventionally, it is known that a circuit has a channel through which coolant for cooling an engine as a power source of a vehicle flows, a channel through which coolant for cooling a motor drive having an electric motor as a power source and its high-voltage components flows, and a channel through which oil for lubricating inside a transmission flows. The circuit exchanges heat between the coolant for cooling the motor drive and the oil for lubricating inside the transmission.

For example, JP2015-001301A discloses a technology for exchanging heat between a first oil for lubricating a toroidal transmission and coolant for a motor drive. Further, according to this technology, a second oil different from the first oil lubricates a power transmission mechanism (gear) provided downstream of a power transmission path of the toroidal transmission, and the heat exchange is performed between the second oil and a selected one of the coolant for the motor drive and coolant for an engine, which is higher in temperature.

Here, in order to improve the fuel efficiency of the vehicle, a drive resistance in the transmission may be reduced. Therefore, particularly for stepped transmissions, the viscosity of the transmission oil which is lubrication oil in the transmission is desired to be lower, and it is effective to improve the temperature of the transmission oil. On the other hand, if the temperature of the transmission oil rises excessively, poor lubrication of components, such as gears in the transmission, may occur, and it is necessary to suppress this excessive temperature rise.

Here, according to the technology of JP2015-001301A, the oil for lubricating a transmission mechanism of the transmission only exchanges the heat with the coolant for the motor drive which is lower in temperature than the engine coolant to lower the oil temperature and maintain the high viscosity. Thus, it intentionally increases the drive resistance. In addition, the transmission mechanism of the transmission and the power transmission mechanism downstream thereof are lubricated individually with different oils which can be controlled to different temperatures. In the power transmission mechanism, one heat exchanger (refrigerant switching mechanism) uses, for the heat exchange, one of the coolant for the motor drive and the coolant for the engine, which is higher in temperature to reduce an agitating resistance of the power transmission mechanism and a driving load.

However, although the technology of JP2015-001301A can keep the temperature of the first oil low for the heat exchange of the transmission mechanism of the transmission, and can make the temperature of the second oil higher for the heat exchange of the power transmission mechanism, it is not a technology for suppressing the excessive temperature rise, and therefore, there is a problem that the poor lubrication of the components of the power transmission mechanism may occur.

SUMMARY OF THE DISCLOSURE

Therefore, the present disclosure is made in view of solving the problem described above, and one purpose thereof is to provide a cooling device for a vehicle which can increase temperature of oil of a transmission at an early stage to reduce drive resistance, and can suppress an excessive temperature rise to suppress poor lubrication in the transmission.

According to one aspect of the present disclosure, a cooling device for a vehicle is provided, which includes a first coolant channel through which a first coolant for cooling an engine flows, a second coolant channel through which a second coolant for cooling a motor drive flows, and an oil channel through which oil for lubricating inside a transmission flows. The oil channel includes a first heat exchanger configured to exchange heat between the first coolant and the oil, a second heat exchanger configured to exchange heat between the second coolant and the oil, and a valve configured to adjust a first flow rate of the oil circulating through the first heat exchanger and a second flow rate of the oil circulating through the second heat exchanger.

According to this configuration, the oil channel is provided with the first heat exchanger which exchanges heat between the first coolant and the oil, the second heat exchanger which exchanges heat between the second coolant and the oil, and the valve which can adjust the oil flow rate which circulates through the first heat exchanger and the oil flow rate which circulates through the second heat exchanger. By such a configuration, the first heat exchanger can use the high temperature first coolant which received heat from the engine to raise the temperature of the oil of the transmission at an early stage, and the second heat exchanger can use the comparatively lower temperature second coolant which received heat from the motor drive of which the calorific value is lower than the engine to cool the temperature-raised oil of the transmission, or lower a rate of increase in the temperature. Therefore, by the valve adjusting the oil flow rate which circulates through the first heat exchanger and the oil flow rate which circulates through the second heat exchanger according to the rate of increase in the temperature of the oil of the transmission, the temperature of the oil of the transmission can be raised at an early stage to reduce a drive resistance of the transmission, and an excessive temperature rise of the oil can be suppressed to suppress poor lubrication in the transmission.

The cooling device may further include a first radiator provided to the first coolant channel and configured to cool the first coolant, and a second radiator provided to the second coolant channel independently from the first radiator, and configured to cool the second coolant. According to this configuration, since the radiators are provided independently to the first coolant channel and the second coolant channel, it is difficult to give the effect of heat between the first coolant and the second coolant. Thus, more effectively, the temperature of the oil of the transmission can be raised at an early stage to reduce the drive resistance, and the excessive temperature rise of the oil can be suppressed to suppress the poor lubrication in the transmission.

The valve may make the first flow rate larger than the second flow rate when a temperature of the oil is below a given temperature, and make the second flow rate larger, when the temperature of the oil exceeds the given temperature, than when the temperature of the oil is below the given temperature. According to this configuration, by using the valve (e.g., solenoid valve), the temperature of the oil of the transmission can be raised at an early stage to reduce the drive resistance, and the excessive temperature rise of the oil can be more effectively suppressed to suppress the poor lubrication in the transmission.

The valve may allow the oil to circulate through only the first heat exchanger when a temperature of the oil is below a given temperature, and allow the oil to circulate through both the first heat exchanger and the second heat exchanger when the temperature of the oil exceeds the given temperature. According to this configuration, since the valve (e.g., two-way valve like a thermostat) allows the oil to circulate through only the first heat exchanger which exchanges heat with the comparatively hot first coolant when the oil temperature is at the low temperature below the given temperature, and it switches the oil path so that the oil circulates through the comparatively-cold second heat exchanger when the oil temperature is at the high temperature exceeding the given temperature, the temperature of the oil of the transmission can be raised more effectively at an early stage to reduce the drive resistance, and the excessive temperature rise can be suppressed to suppress the poor lubrication in the transmission.

The transmission may be a stepped transmission. According to this configuration, the temperature of the oil of the transmission can be raised at an early stage to reduce the drive resistance, and the excessive temperature rise of the oil can be more effectively suppressed to suppress the poor lubrication in the transmission.

The valve may be a solenoid valve configured to adjust a flow rate of the oil flowing into the second heat exchanger and may be provided to a channel of the oil channel. An opening of the solenoid valve device may be adjusted according to a temperature of the oil detected by an oil temperature sensor provided to the oil channel to adjust the first flow rate and the second flow rate.

The solenoid valve may be controlled so that the first flow rate becomes larger than the second flow when the temperature of the oil is below a given temperature, and the second flow rate becomes larger, when the temperature of the oil exceeds the given temperature, than when the temperature of the oil is below the given temperature.

The valve may be a two-way valve configured to fully separate the oil flowing through a first channel of the oil channel from the oil flowing through a second channel of the oil channel, and may be provided to the oil channel at a branch part where a second channel branches from the first channel. The two-way valve may be opened and closed according to a temperature of the oil detected by an oil temperature sensor provided to the oil channel to adjust the first flow rate and the second flow rate of.

The two-way valve may be closed so that the oil circulates through only the first heat exchanger when the temperature of the oil is below a given temperature. The two-way valve may be opened so that the oil circulates through both the first heat exchanger and the second heat exchanger when the temperature of the oil exceeds the given temperature.

DETAILED DESCRIPTION OF THE DISCLOSURE

Hereinafter, cooling devices for a vehicle according to embodiments of the present disclosure will be described with reference to the accompanying drawings.

Figure 1:
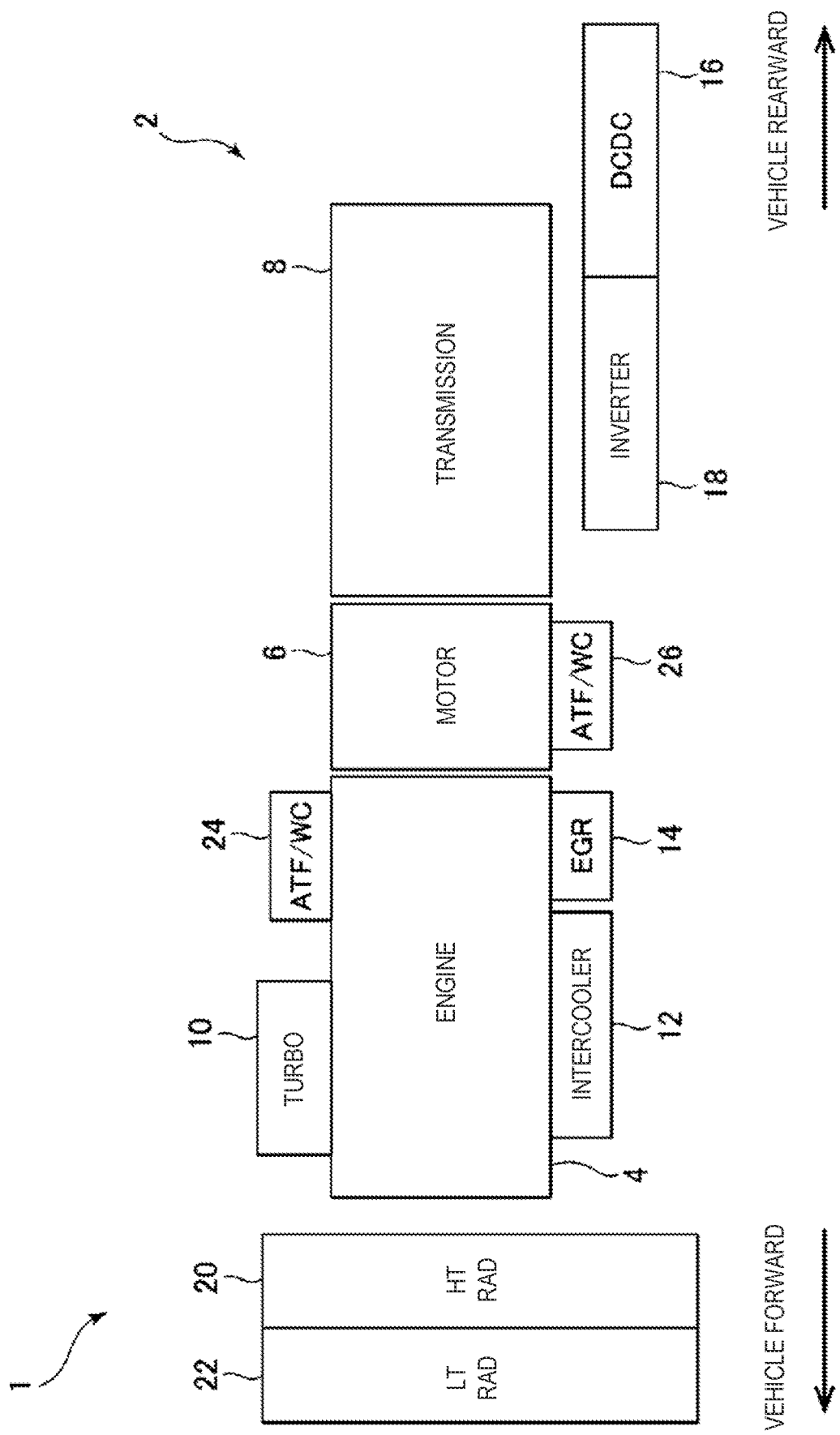
FIG. 1 is a plan view schematically illustrating a configuration of a power source and a power transmission mechanism of a vehicle to which a cooling device according to a first embodiment of the present disclosure is applied.

First, referring to FIG. 1, an outline configuration of a power transmission system of a vehicle to which a cooling device according to a first embodiment of the present disclosure is applied is described. FIG. 1 is a plan view schematically illustrating a configuration of a power source and a power transmission mechanism of the vehicle to which the cooling device according to the first embodiment of the present disclosure is applied.

As illustrated in FIG. 1, a power transmission system 2 to which the cooling device 1 according to the first embodiment of the present disclosure is applied includes an engine 4 and a motor 6 which are power sources, and a transmission 8 which is a power transmission device. In this embodiment, although the engine 4 is a multi-cylinder (six cylinders) longitudinal engine, it may have any number of cylinders (e.g., four cylinders).

The vehicle according to this embodiment is a front-engine rear-wheel-drive (FR) vehicle where the motor 6 is provided between the engine 4 and the transmission 8, and the transmission 8 is a longitudinal transmission provided rearward of the motor 6. The power of the engine 4 and/or the motor 6 is transmitted to the transmission 8, and it is transmitted to rear wheels (not illustrated) through a propeller shaft and a differential device (not illustrated). Although the transmission 8 is an automatic transmission, it may be a manual transmission. Note that the cooling device 1 according to this embodiment of the present disclosure may be also applicable to a front-wheel-drive vehicle having a power transmission system (not illustrated) with a transverse engine and a transverse transmission, as a modification.

Next, as illustrated in FIG. 1, the engine 4 of the power transmission system 2 according to this embodiment includes a supercharger (turbocharger) 10, an intercooler 12 for cooling intake gas containing intake air (fresh air) and exhaust gas recirculation (EGR) gas, and an EGR system 14 which circulates exhaust gas to the intake side. In this embodiment, although the supercharger 10 is a turbocharger which utilizes exhaust pressure, it may be an electric turbocharger or a mechanical supercharger.

Moreover, the motor 6 of the power transmission system 2 according to this embodiment is connected to a DC-DC converter (a voltage converter or a potential transformer) 16 and an inverter 18 which are high-voltage components for actuating the motor 6, and the motor 6 and the high-voltage components 16 and 18 constitute a motor drive.

Forward of the engine 4 and the motor 6, an air-cooled radiator 20 for high-temperature coolant (HT radiator) (hereinafter, a first radiator) which cools coolant circulating through the engine 4 to cool the engine 4 by using traveling wind (an air flow caused by the vehicle traveling), and an air-cooled radiator 22 for low-temperature coolant (LT radiator) (hereinafter, a second radiator) provided forward of the first radiator 20 and which cools coolant circulating through and cooling the DC-DC converter 16, the inverter 18 and the motor 6, and the intercooler 12 by the traveling wind, are provided. Each of the radiators 20 and 22 is a heat exchanger which carries out a heat exchange between the traveling wind and the coolant.

Moreover, as illustrated in FIG. 1, a first heat exchanger (Automatic Transmission Fluid/Warmer-Cooler) 24 described later which exchanges heat between the engine coolant and transmission oil is attached to the engine 4, and a second heat exchanger (Automatic Transmission Fluid/Warmer-Cooler) 26 described later which exchanges heat between motor drive coolant and the transmission oil is attached to the motor 6.

Figure 2:
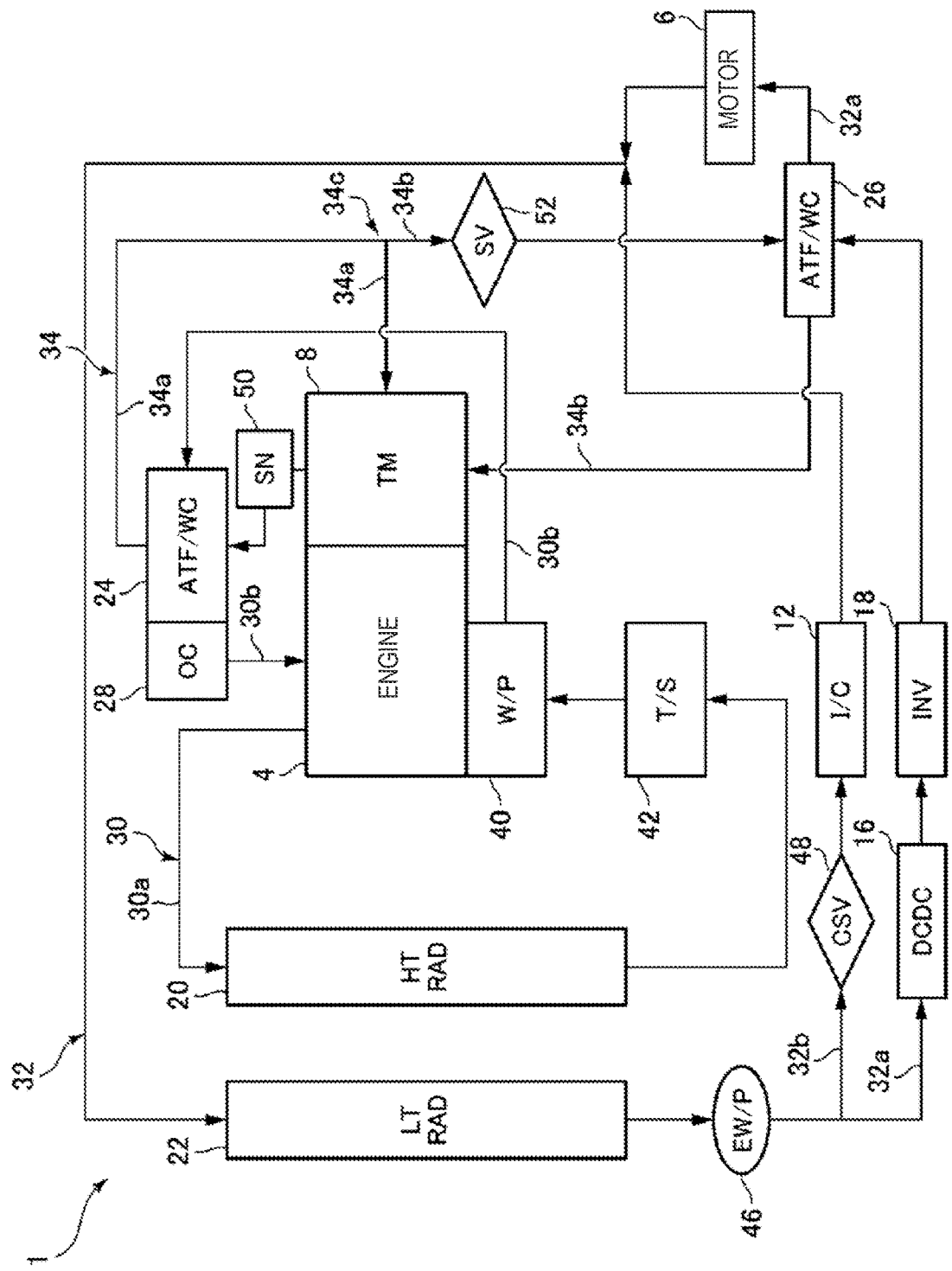
FIG. 2 is a view schematically illustrating a configuration of a heat-exchange circuit for coolant and oil of the cooling device according to the first embodiment of the present disclosure.
Figure 3:
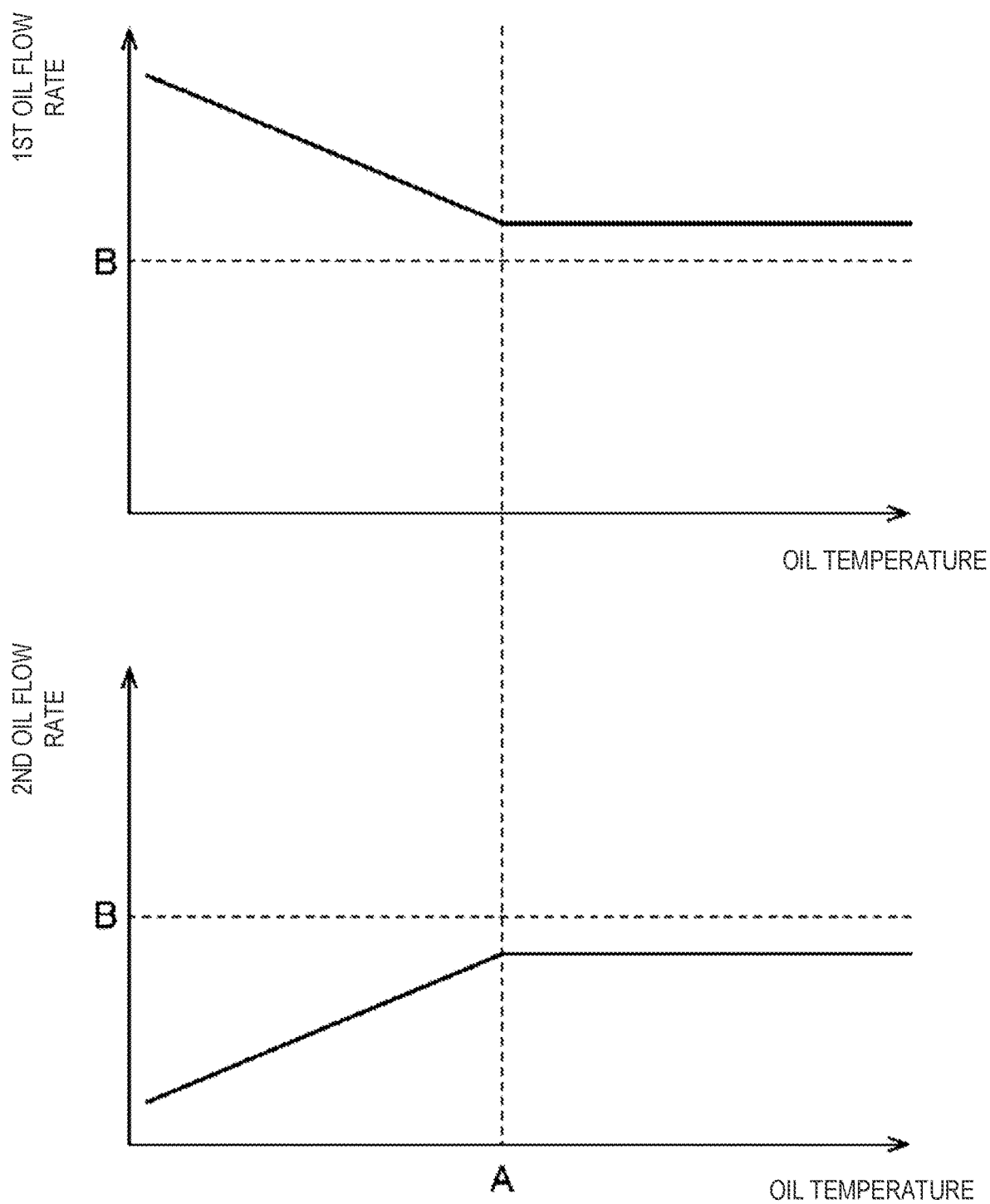
FIG. 3 illustrates charts of one example of a concept of adjustment of an oil flow rate by a valve of the cooling device according to the first embodiment of the present disclosure.

Next, an outline configuration of a heat-exchange circuit for the coolant and the oil including the coolant channel, the oil channel, and the heat exchangers of the cooling device for the vehicle according to the first embodiment of the present disclosure is described with reference to FIGS. 2 and 3. FIG. 2 is a view schematically illustrating the outline configuration of the heat-exchange circuit for the coolant and the oil of the cooling device according to the first embodiment of the present disclosure, and FIG. 3 illustrates charts of one example of a concept of adjustment of an oil flow rate by a valve of the cooling device according to the first embodiment of the present disclosure. First, as illustrated in FIG. 2, the cooling device 1 according to the first embodiment of the present disclosure mainly includes three channels/circuits comprised of a coolant channel 30 for the engine (hereinafter, a first coolant channel), a coolant channel 32 for the motor drive (hereinafter, a second coolant channel), and an oil channel 34 for the transmission (hereinafter, an oil channel).

The first coolant channel 30 is a channel for coolant which circulates and cools the engine 4 and an oil cooler (OC) 28 which cools engine oil inside the engine 4. The second coolant channel 32 is a channel for coolant which circulates and cools the DC-DC converter 16 (DCDC), the inverter 18 (INV) and the motor 6 (MOTOR), and the intercooler 12 (I/C). The oil channel 34 is a channel for the transmission oil which lubricates inside the transmission (TM) 8.

The first coolant channel 30 is described in more detail. The first coolant channel 30 is provided with a water pump 40 which circulates coolant inside the first coolant channel 30. The first coolant channel 30 has two branched channels. First, the first coolant channel 30 has a first channel 30a where coolant circulates through the water pump 40, the engine 4, the first radiator 20, and a thermostat (T/S) 42 as a thermoregulator of the coolant, in this order. The thermostat 42 is a valve which opens when the coolant circulating through the engine 4 is hot enough to be cooled by the radiator 20 so that the coolant circulates through the radiator 20.

The first coolant channel 30 further has a second channel 30b where coolant circulates through the water pump 40, the first heat exchanger 24, an oil cooler 28, and the engine 4, in this order. The first heat exchanger 24 exchanges heat between the coolant which flows through the second channel 30b and the oil (transmission oil) which flows through the oil channel 34.

Next, the second coolant channel 32 is described in more detail. The second coolant channel 32 is provided with a water pump 46 for circulating coolant inside the second coolant channel 32. The second coolant channel 32 has two branched channels. First, the second coolant channel 32 has a first channel 32a where coolant circulates through the water pump 46, the DC-DC converter 16, the inverter 18, the second heat exchanger 26, and the motor 6, in this order. The second heat exchanger 26 exchanges heat between the coolant which flows through the first channel 32a and the oil which flows through the oil channel 34.

Further, the second coolant channel 32 has a second channel 32b which branches from the first channel 32a, and joins the first channel 32a at a location downstream of the motor 6. The second channel 32b allows coolant to circulate through a flow regulating valve/coolant solenoid valve 48 which adjusts a flow rate of the coolant, and the intercooler 12, in this order.

Next, the oil channel 34 is described in more detail. The transmission 8 is provided with an oil pump (not illustrated) which circulates oil inside the transmission 8 and the oil channel 34. The oil pump (not illustrated) is a known oil pump which supplies transmission oil as lubricant/hydraulic fluid to power transmission components inside the transmission 8 (gears, clutches, etc.).

The oil channel 34 has two branched channels. First, the oil channel 34 has a first channel 34a which circulates oil between the transmission 8 and the first heat exchanger 24. This first channel 34a is also a channel which bypasses the second heat exchanger 26. Further, the oil channel 34 has a second channel 34b which branches at a branch part 34c from the first channel 34a, and circulates the oil which circulated through the transmission 8 and the first heat exchanger 24 to the second heat exchanger 26, and circulates it from the second heat exchanger 26 to the transmission 8.

Moreover, the oil channel 34 is provided with an oil temperature sensor (SN) 50 which detects temperature of the oil. This oil temperature sensor 50 may be provided at any location of the oil channel 34, as long as it can detect the temperature of the oil. Moreover, a solenoid valve device (SV) 52 which adjusts a flow rate of oil which flows into the second heat exchanger 26 is provided to the second channel 34b of the oil channel 34. The solenoid valve device 52 is an electromagnetic solenoid valve, and is capable of adjusting an opening of the valve by an On-Off control which changes a duty ratio. In this embodiment, the solenoid valve device 52 is configured so that it adjusts its opening according to the oil temperature detected by the oil temperature sensor 50 to adjust a flow rate of oil which circulates through the first heat exchanger 24 (first oil flow rate) and a flow rate of oil which circulates through the second heat exchanger 26 (second oil flow rate).

For example, as illustrating one example of the adjustment concept of the flow rate in FIG. 3, when the oil temperature is below a given temperature A (e.g., 80° C.), the solenoid valve device 52 makes the first oil flow rate larger than the second oil flow rate. Moreover, the second oil flow rate when exceeding the given temperature A is made larger than the second oil flow rate when not exceeding the given temperature A. Note that in the example illustrated in FIG. 3, the first oil flow rate is adjusted to be larger than a given flow rate B and the second oil flow rate is adjusted to be smaller than the given flow rate B. The given temperature A is set so that the temperature of the oil is raised at an early stage to reduce the drive resistance of the transmission 8 and an excessive rise of the oil temperature is suppressed.

Figure 4:
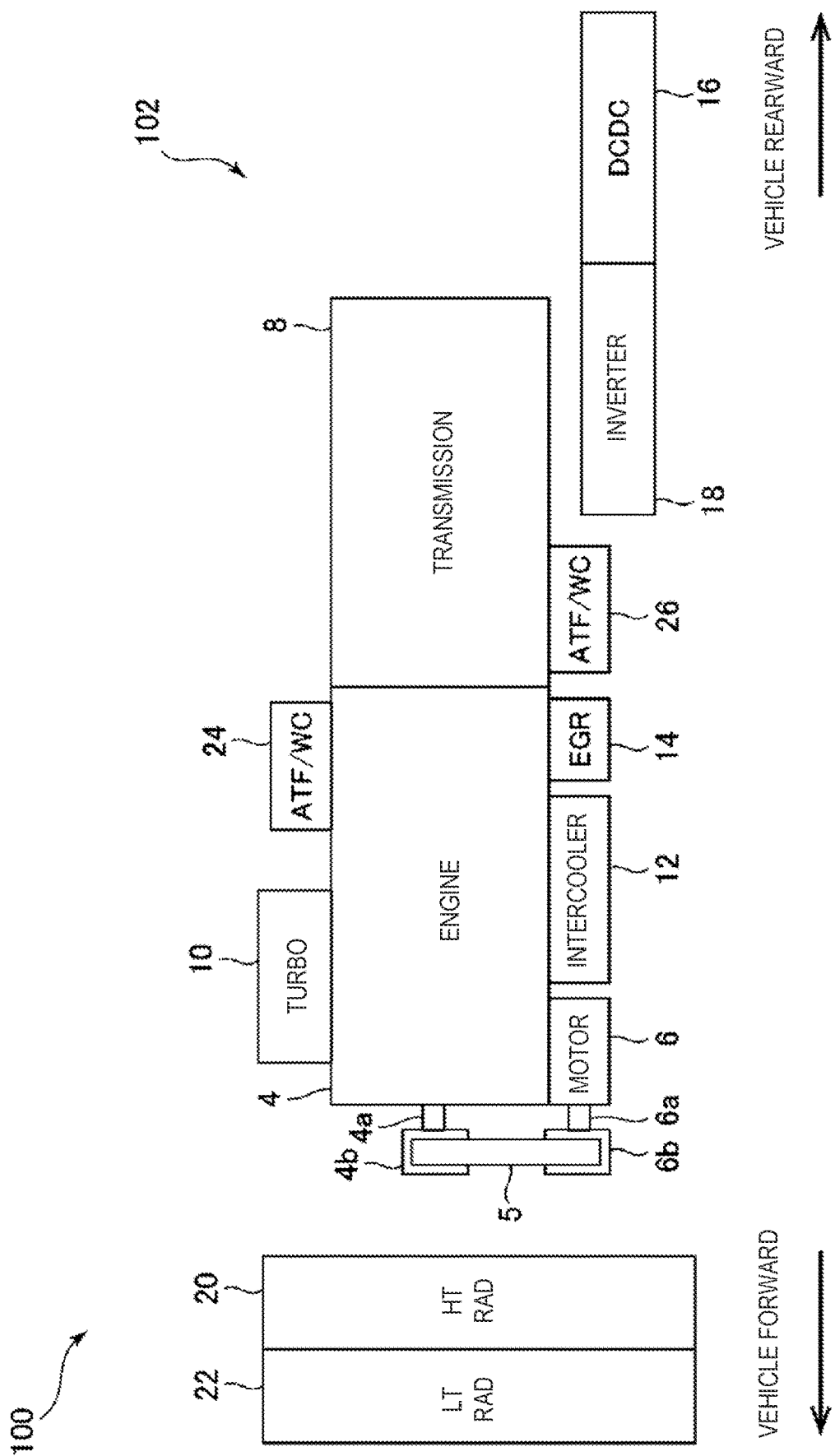
FIG. 4 is a plan view schematically illustrating a configuration of a power source and a power transmission mechanism of a vehicle to which a cooling device according to a second embodiment of the present disclosure is applied.
Figure 5:
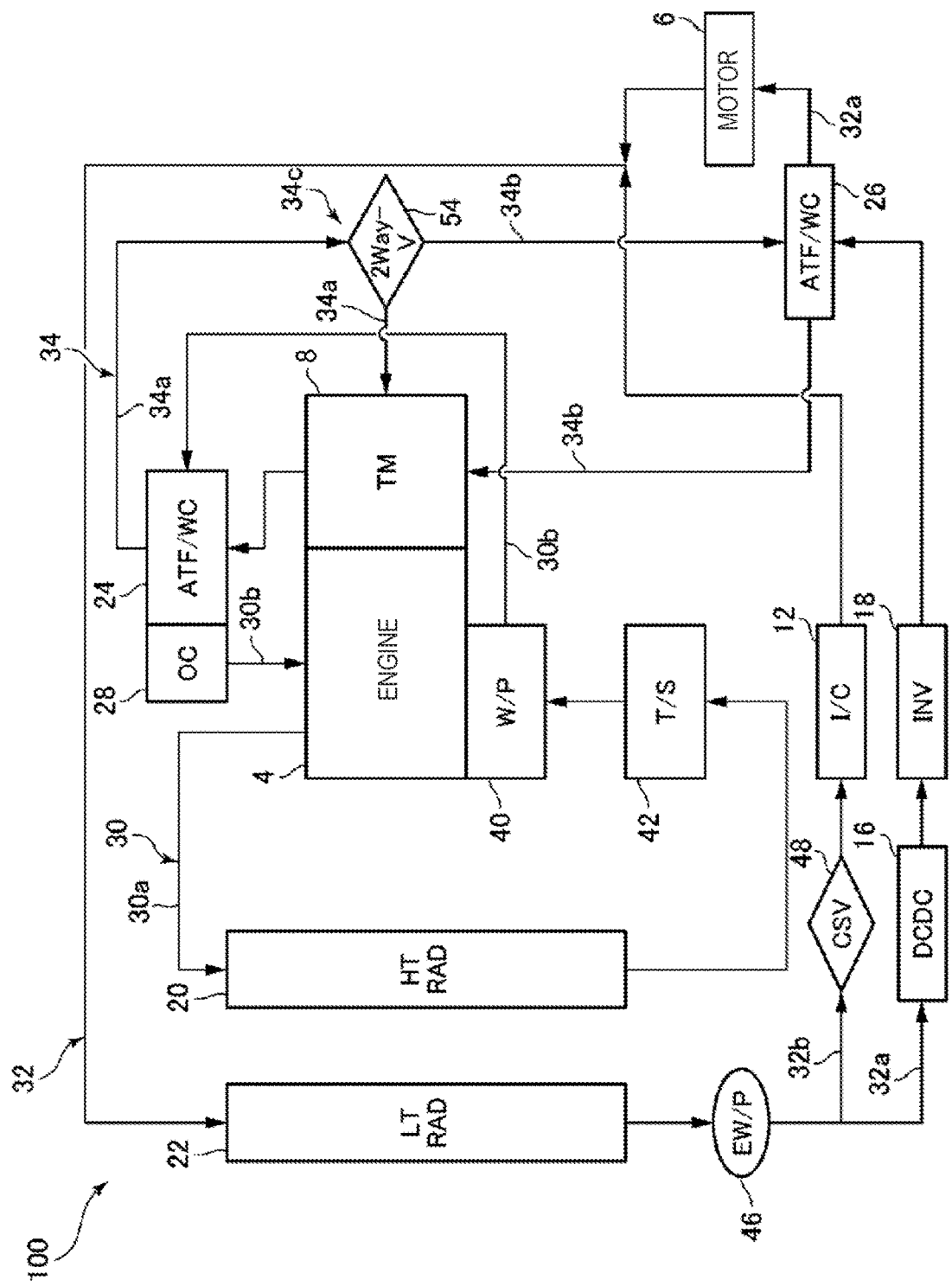
FIG. 5 is a view schematically illustrating a configuration of a heat-exchange circuit for coolant and oil of the cooling device according to the second embodiment of the present disclosure.
Figure 6:
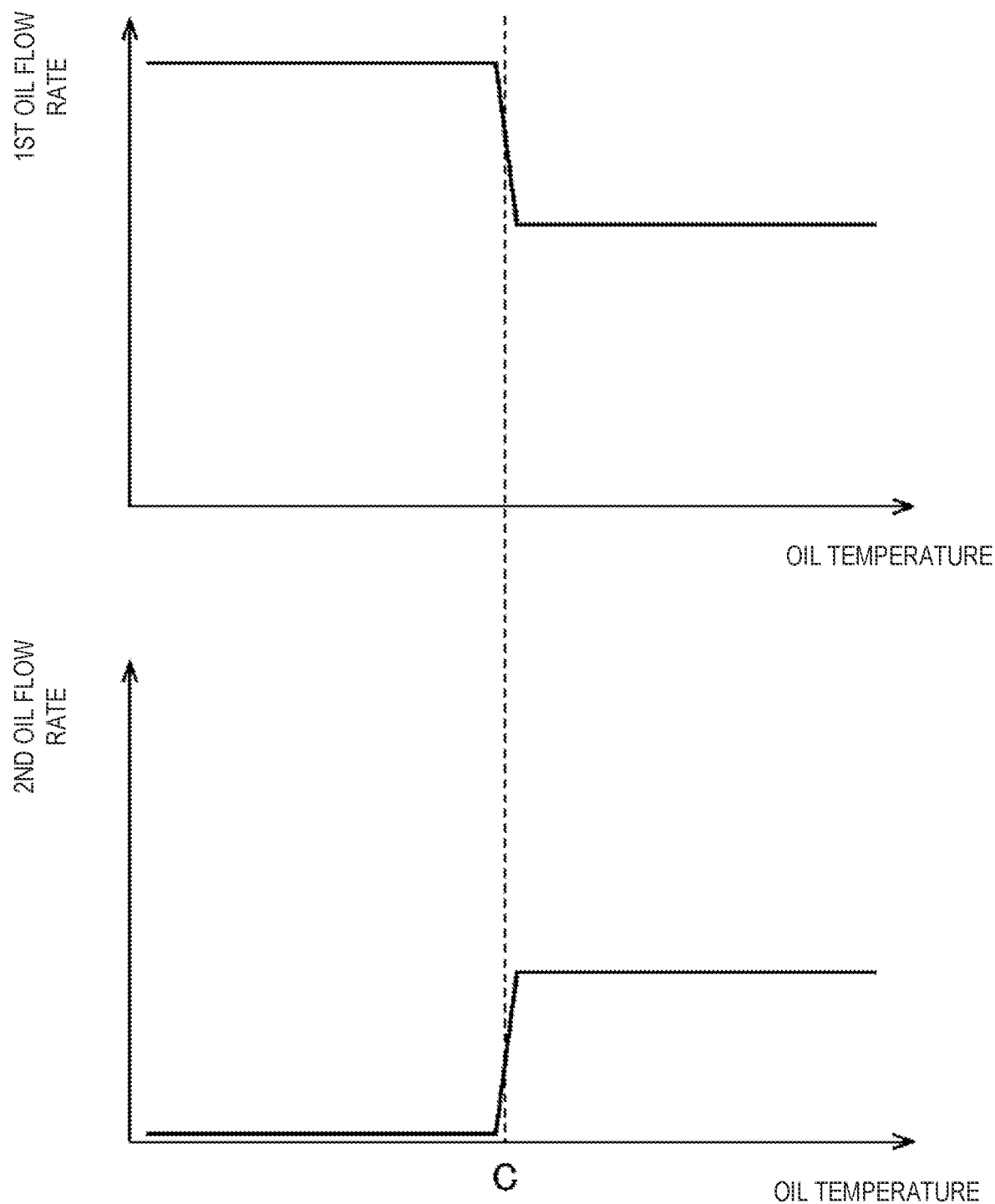
FIG. 6 illustrates charts of one example of a concept of adjustment of an oil flow rate by a valve of the cooling device according to the second embodiment of the present disclosure.

Next, a cooling device according to a second embodiment of the present disclosure is described with reference to FIGS. 4 to 6. FIG. 4 is a plan view illustrating an outline configuration of a power source and a power transmission mechanism of a vehicle to which the cooling device according to the second embodiment of the present disclosure is applied. FIG. 5 is a view schematically illustrating an outline configuration of a heat-exchange circuit for coolant and oil of the cooling device according to the second embodiment of the present disclosure. FIG. 6 illustrates charts of one example of a concept of adjustment of an oil flow rate by a valve of the cooling device according to the second embodiment of the present disclosure. Below, a configuration different from the first embodiment is mainly described. As for the configuration of the second embodiment, the same reference characters are assigned to the same components with the first embodiment, even though the components are different in layout.

First, as illustrated in FIG. 4, a power transmission system 102 to which a cooling device 100 according to the second embodiment of the present disclosure is applied includes, similarly to the first embodiment, the engine 4 and the motor 6 which are the power sources, the transmission 8, the supercharger 10, the intercooler 12, the EGR system 14, the DC-DC converter 16, the inverter 18, the air-cooled radiator 20 for high-temperature coolant (first radiator), the air-cooled radiator 22 for low-temperature coolant (second radiator), the first heat exchanger 24, and the second heat exchanger 26.

In the second embodiment, as illustrated in FIG. 4, the motor 6 is not disposed between the engine 4 and the transmission 8, but it is disposed in parallel with the engine 4 in the vehicle width direction. In the second embodiment, a power transmission belt 5 which connects a motor pulley 6b provided to an output shaft 6a of the motor with a crank pulley 4b provided to a crankshaft 4a of the engine 4 is provided, and a driving force of the motor 6 is transmitted to the crankshaft 4a through the belt 5. The power of the engine 4 and/or the motor 6 is/are transmitted to the transmission 8.

Next, as illustrated in FIG. 5, the cooling device 100 according to the second embodiment of the present disclosure mainly includes, similarly to the first embodiment, three channel/circuits comprised of a coolant channel 30 for the engine (first coolant channel) where coolant circulates and cools the engine 4 and the oil cooler 28, a coolant channel 32 for the motor drive (second coolant channel) where coolant circulates and cools the DC-DC converter 16, the inverter 18 and the motor 6, and the intercooler 12, and an oil channel 34 for the transmission (oil channel) where the transmission oil for lubricating inside the transmission 8 circulates.

The first coolant channel 30 is configured similarly to the first embodiment. That is, the first coolant channel 30 is provided with the water pump 40 and it has two branched channels. The first channel 30a of the first coolant channel 30 is a channel where coolant circulates through the water pump 40, the engine 4, the first radiator 20, and the thermostat 42, in this order, and the second channel 30b of the first coolant channel 30 is a channel where coolant circulates through the water pump 40, the first heat exchanger 24, the oil cooler 28, and the engine 4, in this order.

The second coolant channel 32 is configured similarly to the first embodiment. That is, the second coolant channel 32 is provided with the water pump 46, and it has two branched channels. The first channel 32a of the second coolant channel 32 is a channel where coolant circulates through the water pump 46, the DC-DC converter 16, the inverter 18, the second heat exchanger 26, and the motor 6, in this order, and the second channel 32b is a channel which branches from the first channel 32a, and joins the first channel 32a at a location downstream of the motor 6. The first channel 32a allows coolant to circulate through the flow regulating valve 48 which adjusts a flow rate of the coolant, and the intercooler 12, in this order.

The oil channel 34 according to the second embodiment has, similarly to the first embodiment, a first channel 34a which circulates oil between the transmission 8 and the first heat exchanger 24 by an oil pump (not illustrated) provided to the transmission 8, and a second channel 34b which branches from the first channel 34a and which circulates the oil circulated through the transmission 8 and the first heat exchanger 24 to the second heat exchanger 26. The oil channel 34 according to the second embodiment is provided with a two-way valve (2Way-V) 54, instead of the solenoid valve device 52 of the first embodiment. In more detail, the oil channel 34 is further provided, at a branch part 34c where the second channel 34b branches from the first channel 34a, with the two-way valve 54 for fully separating the oil which flows through the first channel 34a from the oil which flows through the second channel 34b. The two-way valve 54 of the second embodiment is a so-called thermostat, and can adjust an oil flow rate which circulates through the first heat exchanger 24 (first oil flow rate) and an oil flow rate which circulates through the second heat exchanger 26 (second oil flow rate) by being opened and closed according to the oil temperature of the oil channel 34.

For example, as illustrating one example of the adjustment concept of the flow rate in FIG. 6, when the oil temperature is below a given temperature C (e.g., 80° C.), the two-way valve 54 is closed so that the oil circulates only to the first heat exchanger 24, and on the other hand, when the oil temperature exceeds the given temperature C, the two-way valve 54 is opened so that the oil circulates to both the first heat exchanger 24 and the second heat exchanger 26. The given temperature C is set so that the temperature of the oil is raised at an early stage to reduce the drive resistance of the transmission 8 and the excessive rise of the oil temperature is suppressed.

Note that the power transmission system 102 of the second embodiment may be used as the power transmission system 2 of the first embodiment, and the circuit of the second embodiment including the two-way valve 54 may be used in this power transmission system 2. Similarly, the power transmission system 2 of the first embodiment may be used as the power transmission system 102 of the second embodiment, and the circuit of the first embodiment including the solenoid valve 52 may be used in this power transmission system 102.

Next, main operation and effects of the cooling device according to the embodiments of the present disclosure are described. First, in the cooling devices 1 and 100 according to the first and second embodiments of the present disclosure, the oil channel 34 is provided with the first heat exchanger 24 which exchanges heat between the coolant of the first coolant channel 30 and the oil of the oil channel 34, the second heat exchanger 26 which exchanges heat between the coolant of the second coolant channel 32 and the oil of the oil channel 34, and the valves 52 and 54 (solenoid valve and two-way valve) which can adjust the oil flow rate which circulates through the first heat exchanger 24 and the oil flow rate which circulates through the second heat exchanger 26.

By such a configuration, the first heat exchanger 24 can use the hot first coolant which received heat from the engine 4 to raise the temperature of the oil of the transmission 8 at an early stage, and the second heat exchanger 26 can use the comparatively cold second coolant which received heat from the motor drives 6, 16, and 18 of which the calorific value is lower than the engine 4 to cool the temperature-raised oil of the transmission 8, or lower a rate of increase in the temperature. Therefore, by the valves 52 and 54 adjusting the oil flow rate which circulates through the first heat exchanger 24 and the oil flow rate which circulates through the second heat exchanger 26 according to the rate of increase in the temperature of the oil of the transmission 8, the temperature of the oil of the transmission 8 can be raised at an early stage to reduce the drive resistance of the transmission 8, and the excessive temperature rise of the oil can be suppressed to suppress the poor lubrication in the transmission 8.

Moreover, according to the first and second embodiments, since the radiators 20 and 22 are provided independently to the first coolant channel 30 and the second coolant channel 32, it is difficult to give the effect of heat between the first coolant and the second coolant. Thus, more effectively, the temperature of the oil of the transmission 8 can be raised at an early stage to reduce the drive resistance of the transmission 8, and the excessive temperature rise of the oil can be suppressed to suppress the poor lubrication in the transmission 8.

Moreover, according to the first embodiment, when the temperature of the oil of the transmission 8 is below the given temperature (e.g., the temperature A illustrated in FIG. 3), since the solenoid valve device 52 which is the valve makes the oil flow rate which circulates through the first heat exchanger 24 larger than the oil flow rate which circulates through the second heat exchanger 26, the valve 52 can more effectively raise the temperature of the oil of the transmission 8 at an early stage to reduce the drive resistance. Moreover, according to the first embodiment, when the temperature of the oil of the transmission 8 exceeds the given temperature (e.g., the temperature A illustrated in FIG. 3), since the solenoid valve device 52 which is the valve makes the oil flow rate which circulates through the second heat exchanger 26 larger than that when the temperature is below the given temperature, the valve 52 can more effectively suppress the excessive temperature rise of the oil of the transmission 8 to suppress the poor lubrication in the transmission 8.

Moreover, according to the second embodiment, since the two-way valve 54 which is the valve allows the oil to circulate through only the first heat exchanger 24 which exchanges heat with the comparatively hot first coolant when the oil temperature of the transmission 8 is at the low temperature below the given temperature (e.g., the temperature C illustrated in FIG. 6), and it switches the oil path so that the oil circulates through the comparatively-cold second heat exchanger 26 when the oil temperature is at the high temperature exceeding the given temperature, the temperature of the oil of the transmission 8 can be raised more effectively at an early stage to reduce the drive resistance, the excessive temperature rise can be suppressed to suppress the poor lubrication in the transmission 8.

Moreover, in the first and second embodiments, since the transmission 8 is the stepped transmission, the cooling devices 1 and 100 of the first and second embodiments can effectively raise the temperature of the oil of the transmission 8 at an early stage to reduce the drive resistance, and the excessive temperature rise can be suppressed to suppress the poor lubrication in the transmission 8.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1, 100 Cooling Device
2, 102 Power Transmission System
4 Engine
6 Motor (Motor Drive)
8 Transmission
10 Supercharger
12 Intercooler
14 EGR System
16 DC-DC Converter (High-voltage Component, Motor Drive)
18 Inverter (High-voltage Component, Motor Drive)
20 Radiator for Engine Coolant (First Radiator)
22 Radiator for Motor Drive (Second Radiator)
24 First Heat Exchanger
26 Second Heat Exchanger
30 Coolant Channel for Engine (First Coolant Channel)
30a First Channel of Coolant Channel for Engine
30b Second Channel of Coolant Channel for Engine
32 Coolant Channel for Motor Drive (Second Coolant Channel)
32a First Channel of Coolant Channel for Motor Drive
32b Second Channel of Coolant Channel for Motor Drive
34 Oil Channel for Transmission
34a First Channel of Oil Channel for Transmission
34b Second Channel of Oil Channel for Transmission
48 Flow Regulating Valve/Coolant Solenoid Valve
50 Oil Temperature Sensor
52 Solenoid Valve (Valve)
54 Two-way Valve (Valve)

What is claimed is:

1. A cooling device for a vehicle, comprising:
   a first coolant channel through which a first coolant for cooling an engine flows;
   a second coolant channel through which a second coolant for cooling a motor drive flows; and
   an oil channel through which oil for lubricating inside a transmission flows, the oil channel including:
   a first heat exchanger configured to exchange heat between the first coolant and the oil;
   a second heat exchanger configured to exchange heat between the second coolant and the oil; and
   a valve configured to adjust a first flow rate of the oil circulating through the first heat exchanger and a second flow rate of the oil circulating through the second heat exchanger.

2. The cooling device of claim 1, further comprising:
   a first radiator provided to the first coolant channel and configured to cool the first coolant; and
   a second radiator provided to the second coolant channel independently from the first radiator, and configured to cool the second coolant.

3. The cooling device of claim 2, wherein the valve makes the first flow rate larger than the second flow rate when a temperature of the oil is below a given temperature, and makes the second flow rate larger, when the temperature of the oil exceeds the given temperature, than when the temperature of the oil is below the given temperature.

4. The cooling device of claim 3, wherein the transmission is a stepped transmission.

5. The cooling device of claim 2, wherein the valve allows the oil to circulate through only the first heat exchanger when a temperature of the oil is below a given temperature, and allows the oil to circulate through both the first heat exchanger and the second heat exchanger when the temperature of the oil exceeds the given temperature.

6. The cooling device of claim 2, wherein the transmission is a stepped transmission.

7. The cooling device of claim 1, wherein the valve makes the first flow rate larger than the second flow rate of the oil when a temperature of the oil is below a given temperature, and makes the second flow rate larger, when the temperature of the oil exceeds the given temperature, than when the temperature of the oil is below the given temperature.

8. The cooling device of claim 7, wherein the transmission is a stepped transmission.

9. The cooling device of claim 1, wherein the valve allows the oil to circulate through only the first heat exchanger when a temperature of the oil is below a given temperature, and allows the oil to circulate through both the first heat exchanger and the second heat exchanger when the temperature of the oil exceeds the given temperature.

10. The cooling device of claim 9, wherein the transmission is a stepped transmission.

11. The cooling device of claim 1, wherein the transmission is a stepped transmission.

12. The cooling device of claim 1,
wherein the valve is a solenoid valve configured to adjust a flow rate of the oil flowing into the second heat exchanger, and is provided to a channel of the oil channel, and
wherein an opening of the solenoid valve device is adjusted according to a temperature of the oil detected by an oil temperature sensor provided to the oil channel to adjust the first flow rate and the second flow rate.

13. The cooling device of claim 12, wherein the solenoid valve device is controlled so that the first flow rate becomes larger than the second flow rate when the temperature of the oil is below a given temperature, and the second flow rate becomes larger, when the temperature of the oil exceeds the given temperature, than when the temperature of the oil is below the given temperature.

14. The cooling device of claim 1,
wherein the valve is a two-way valve configured to fully separate the oil flowing through a first channel of the oil channel from the oil flowing through a second channel of the oil channel, and is provided to the oil channel at a branch part where a second channel branches from the first channel, and
wherein the two-way valve is opened and closed according to a temperature of the oil detected by an oil temperature sensor provided to the oil channel to adjust the first flow rate and the second flow rate.

15. The cooling device of claim 14,
wherein the two-way valve is closed so that the oil circulates through only the first heat exchanger when the temperature of the oil is below a given temperature, and
wherein the two-way valve is opened so that the oil circulates through both the first heat exchanger and the second heat exchanger when the temperature of the oil exceeds the given temperature.

* * * * *